United States Patent
Antreasyan et al.

(10) Patent No.: US 11,566,889 B2
(45) Date of Patent: Jan. 31, 2023

(54) PORTABLE MEASURING DEVICE WITH AUTOCALIBRATION AND AUTOCONFIGURATION

(71) Applicant: TESA SARL, Renens (CH)

(72) Inventors: Dikran Antreasyan, Meyrin (CH); Laurent Demierre, Eysins (CH); Serge Mariller, Cheseaux-sur-Lausanne (CH)

(73) Assignee: TESA SARL, Renens (CH)

( * ) Notice: Subject to any disclaimer, the term of this patent is extended or adjusted under 35 U.S.C. 154(b) by 617 days.

(21) Appl. No.: 16/562,353

(22) Filed: Sep. 5, 2019

(65) Prior Publication Data

US 2020/0080839 A1    Mar. 12, 2020

(30) Foreign Application Priority Data

Sep. 6, 2018 (EP) .................................... 18193014

(51) Int. Cl.
*G01B 21/04* (2006.01)
*H04W 84/18* (2009.01)

(52) U.S. Cl.
CPC ......... *G01B 21/042* (2013.01); *G01B 21/045* (2013.01); *H04W 84/18* (2013.01)

(58) Field of Classification Search
CPC .... G01B 21/042; G01B 21/045; G01B 21/16; G01B 21/18; G01B 5/08; G01B 5/10; G01B 5/14; G01B 5/143; G01B 5/02; G01B 5/18; G01B 21/02–20; H04W 84/18
USPC ............ 73/1.75, 1.79, 1.81, 1.08–1.11, 1.82; 33/542–544.6, 783, 784, 787–789
See application file for complete search history.

(56) References Cited

U.S. PATENT DOCUMENTS

| | | | | |
|---|---|---|---|---|
| 4,362,935 A | * | 12/1982 | Clark, III | G01N 23/223 378/98 |
| 5,251,156 A | * | 10/1993 | Heier | G01B 11/005 356/426 |
| 6,298,255 B1 | | 10/2001 | Cordero et al. | |
| 6,487,896 B1 | | 12/2002 | Dall'Aglio | |
| 2003/0065467 A1 | | 4/2003 | Schuh et al. | |
| 2012/0004886 A1 | | 1/2012 | Jordil et al. | |

(Continued)

FOREIGN PATENT DOCUMENTS

| | | | |
|---|---|---|---|
| EA | 020255 | * | 9/2014 |
| EP | 0703430 | * | 7/2001 |

(Continued)

OTHER PUBLICATIONS

EESR in EP application No. 18193014.0 dated Nov. 12, 2018.

*Primary Examiner* — Robert R Raevis
(74) *Attorney, Agent, or Firm* — Maschoff Brennan

(57) ABSTRACT

A portable measuring device having: a measuring apparatus comprising a logic circuit and a reader, an accessory interchangeably connectable to the measuring apparatus and storing individual metrology information relative to the accessory in a form compatible with the reader, wherein the measuring apparatus is configured, while it is connected to the accessory, to: read the individual calibration information with the reader; acquire, using the accessory, a signal dependent from a metrology-related property of an object; convert the signal into a measure value in the logic circuit, using the individual metrology information of the accessory; output the measure value.

8 Claims, 2 Drawing Sheets

(56) References Cited

U.S. PATENT DOCUMENTS

2013/0185950 A1 7/2013 Oode et al.
2016/0370220 A1 12/2016 Ackley et al.

FOREIGN PATENT DOCUMENTS

EP 2402714 A1 1/2012
GB 2506858 A 4/2014

* cited by examiner

PORTABLE MEASURING DEVICE WITH AUTOCALIBRATION AND AUTOCONFIGURATION

FIELD OF THE INVENTION

The present invention concerns a portable measuring device that is usable together with an accessory for measuring dimensions, coordinates, surface properties, or other metrology-related properties of an object. The accessory includes a memory means that stores a metrology parameter of the accessory, like a range, a scale factor, an offset, or any other metrology parameter, and the instrument is operatively arranged to process a raw measure signal into a corrected measure value, based on the parameter read from the accessory.

DESCRIPTION OF RELATED ART

Precision metrology instruments often consist of a base unit and several interchangeable accessories which are used for specific measurement tasks. Different accessories may have different parameters that must be input to the base unit so that it can process the raw data to obtain a corrected measure value.

Many portable metrology instruments rely on interchangeable accessories. For example, the inner micrometer (bore gauges) manufactured by the applicant under the denomination "TESA alesometer capa μ system". These instruments are composed of a digital measuring apparatus with a set of interchangeable measuring heads, each adapted for a specific range of diameters.

In many use cases, the accessory is characterized by a type such that all the accessories of a given type are assigned a same nominal value of the relevant parameters. Some accessories have unique metrology parameters, however, and must be characterized individually.

In metrology measurements, it is known to verify an instrument or prepare a measurement by an instrument by measuring a calibration gauge that has a precisely known dimension. In the case of the inner micrometer mentioned above, rings machined to a precise diameter (notably with an accuracy in micron-submicron ranges) are used as calibration gauges. Different instruments require gauges of different dimension and shapes, however, for example spheres or blocks. The relevant dimension of the calibration gauge (i.e. the inner diameter of a ring, the radius of a sphere, the thickness of a block, and so on) are measured precisely and communicated in a certificate. Often, the comparison of the measured value with the correct one is done manually and, when it is automatic, the correct dimension is put manually in the instrument, for example by punching its numeric value on a keyboard.

EP2402714A discloses a metrology system comprising a plurality of probes whereby each probe stores a unique internal identifier which is transmitted wirelessly to the control unit. U.S. Pat. No. 6,298,255 discloses a biophysical sensor which stores several parameters in a memory and communicates them to the monitoring unit for verification.

Outside the proper domain of precision metrology and/or dimensional metrology, US20160370220 describes a volume dimensioner which infers the dimensions of packages on a conveyor belt by analysing the images provided by a remote optical sensor. The dimensioner is calibrated by using reference objects that have a pattern of reference markings or an RFID tag. However, the coarse measurements obtained by remote sensing and the large tolerance of its calibration make it unsuitable for the domain of precision metrology instruments.

US2013185950 describes a thickness gauge comprising a plurality of blades of different thicknesses and an RFID tag on each blade storing the thickness of the blade. Once the user has inserted an appropriate combination of blades to completely fill a gap, the instrument reads the thicknesses of the inserted blades and calculates the total gap thickness. The blades are permanently joined together, however, and not interchangeable.

On a measuring instrument the manual entry of the metrology parameters of an accessory or of a calibration gauge is prone to error and time consuming. The solution of automatic identification of an accessory and retrieval of its metrology parameters from a pre-stored database requires updating the data base for each new model of accessory and is not easily applicable to calibration gauges which have unique dimensions. Therefore, there is a need for a measuring instrument which receives the metrology parameters directly from an accessory or a calibration gauge, preferably by wireless means, and configures the measurement process accordingly.

BRIEF SUMMARY OF THE INVENTION

The invention proposes a measuring device composed of a measuring apparatus and one accessory that can perform automatically operations that require normally a manual intervention. According to the invention, this is achieved by the object of the main claim, namely by a portable measuring device having: a measuring apparatus comprising a logic circuit and a reader, an accessory interchangeably connectable to the measuring apparatus and storing individual metrology information relative to the accessory in a form compatible with the reader, wherein the measuring apparatus is configured, while it is connected to the accessory, to: read the individual metrology information with the reader; acquire, using the accessory, a signal dependent from a metrology-related property of an object; convert the signal into a measure value in the logic circuit, using the individual metrology information of the accessory; output the measure value.

The dependent claims introduce useful but non-essential features such as: the metrology related property being one among linear dimension, thickness, radius of a sphere, inner diameter, outer diameter, coordinate of a surface point, roughness, surface finish; including range, offset, or a scale factor in the metrology information; storing the metrology information into an RFID or an optically-readable tag; a connector arranged to attach to a mating part of the apparatus, the reader being arranged to read the metrology information of an accessory attached to the connector.

The metrology information may encode directly a parameter of the accessory, possibly a parameter directly related to the conversion of the value provided by the encoder into calibrated units, like the above-mentioned range, offset, or scale factor. It may as well provide a digital identifier that the logic circuit uses as key value to obtain a metrology-related property or a parameter from a data source.

The invention can be used advantageously also with calibration gauges which are indispensable accessories for precision metrology instruments, even though they are not physically attached to them. The calibration gauge can store in a tag its reference calibration value as well as other relevant data. The information can be stored in a format compatible with the same reader as is used to read the metrology information from the accessory. The calibration can be initiated by a deliberate action of the user, for example on a button or an input device, or automatically by the logic circuit when the reader detects a calibration object nearby.

The invention can be embodied by a portable (notably in particular a hand-held) measuring device for precision and/or dimensional metrology, the device comprising a measuring apparatus being configured to interchangeably connect one of a set of accessories, each accessory being configured to allow metrological measures within different ranges of measurement.

Dimensional metrology is the science of measurement of a (physical/material) dimension of an object (e.g. workpiece), such a linear dimension of an object (dimensional metrology, e.g. a length of a side, the distance between two shoulders, an inner or outer diameter, a depth of a cavity), an angle, a surface status (e.g. a roughness, a thickness of a deposited layer), a coordinate of a point on a surface (with respect to a reference point or another point on the same/other surface), a profile (e.g. of a winding).

Precision metrology is the science of measurement providing accuracies in submultiples of SI base units (e.g. metre) and of SI derived units (e.g. radian), notably with a (submultiple) factor less than of $10^{-3}$, preferably less than $10^{-6}$).

Advantageously, the accessory can be a mechanical accessory. In the context of this specification, "mechanical accessory" indicates an accessory devoid of transducer configured to convert a displacement of a measuring portion of the accessory (in response of a measuring of a metrology-related property of the workpiece) into a signal (e.g. electrical and/or digital signal) dependent from the metrology-related property of the workpiece. The measuring portion can be any moveable (e.g. translatable and/or rotating) portion of the accessory (such as an arm, a screw, a rod, a shaft, a lever, a wheel, a cogwheel, a tip, a contact element or finger), whose displacement (movement) is function of the metrology-related property of the object (e.g. workpiece) under measurement. The accessory can be configured to generate this displacement by physically contacting the workpiece (e.g. contact probe or measuring head).

The measuring apparatus can thus comprise a transducer configured to sense the displacement of the measuring portion when the (mechanical) accessory is connected to the measuring apparatus. Furthermore, measuring apparatus can comprise a mechanical connection or interface for interchangeably and operatively connecting the transducer with the measuring portion of the (connected) accessory.

In particular, the invention can be embodied by an inner micrometer with a plurality of heads (i.e. accessories) for different ranges of measurement, preferably a set of calibration gauges, or any other suitable metrology instrument.

In the context of this specification, the word "portable" indicates a transportable instrument that can be moved from a measuring station to another and used there to take measurements without further steps of disassembly/reassembly, or realignment or calibration, as opposed to "fixed" devices like coordinate measuring machines that, whenever are moved, need at least a recalibration, and usually also some assembly/aligning. The word "portable" in this sense encompasses also instruments like height gauges, large micrometers and sliding callipers. Preferably portable instruments are light and compact enough to be moved around in a shop manually, without special precautions or equipment.

Unlike "fixed" devices which usually comprise a computer connected to a network, and are powered by mains voltage, "portable" instruments generally operate in stand-alone fashion, powered by a battery and, when they communicate with other machines, they do so wirelessly or via detachable networking systems, like USB.

Among portable instruments, "hand-held" instruments are those that, because of their compact dimensions, can take a measurement while being held in the hands of a user. Micrometers, sliding callipers and comparators, among others, fall in this category.

The present invention is particularly suitable for implementing autocalibration and autoconfiguration in portable and hand-held instruments because it does not require complex processing means. Moreover, input means in portable instruments usually take the form of small keyboards or push-buttons and the manual introduction of numeric parameters is especially cumbersome and error-prone.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
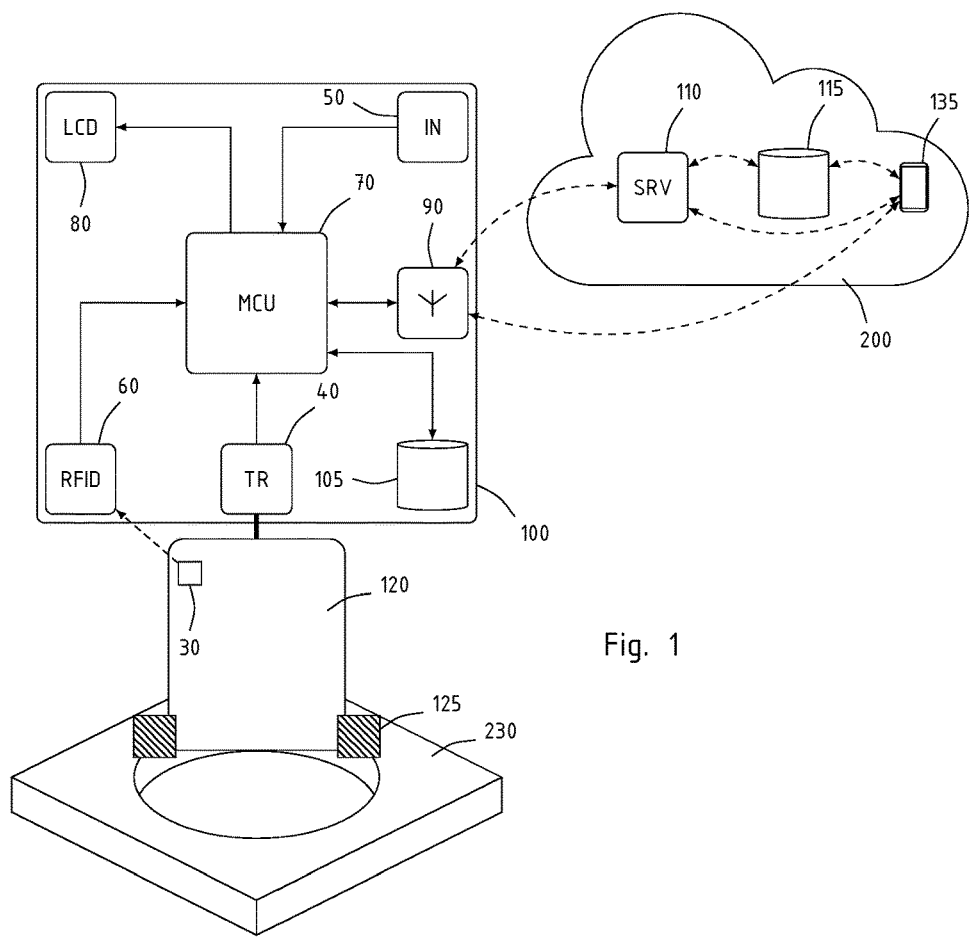
FIG. 1 shows a schematic representation of a device according to an aspect of the invention measuring a workpiece with a characterized accessory

FIG. 1 is a diagram showing the functional structure of a realization of the invention. The measuring apparatus 100 is designed to operate together with a detachable accessory 120 to measure a metrology-related property of a workpiece 230.

The property whose measurement is sought can be: a linear dimension, for example a length of a side, the distance between two shoulders, an inner or outer diameter, a depth of a cavity; an angle; a surface status such as a roughness, a thickness of a deposited layer; a coordinate of a point on a surface; a profile, for example of a winding. This list is not exhaustive.

According to the measurement sought, several measurement techniques are possible in the frame of the invention. Linear dimensions can be measured by mechanical means like micrometres, callipers, height gauges, and comparators, or by optical instruments, for example interferometers. The same instruments can also be used to measure angles together with suitable accessories. In many cases, a single instrument needs a plurality of accessories for covering an extended measuring range, adapting to diverse geometries, or performing different measurements.

In a possible embodiment of the invention, the apparatus 100 may be a digital micrometric head that measures the axial displacement of a precision screw, by means of a transducer 40. The accessory 120 is an inner bore gauge with three linear contact fingers 125 linked to the micrometric head such the axial movements of the micrometric screw cause the contacts to move in and out radially. The radial stroke of the contact fingers 125 is limited to assure accuracy, and the apparatus 100 needs several bore heads having distinct individual ranges, to measure diameters in an extended range.

In a possible use case, one micrometer could be attachable to one of five different measuring heads, each one for a specific range of diameters, such as 40-50 mm, 50-60 mm, 60-70 mm, 70-85 mm, 85-100 mm, each characterized by specific values of the offset (i.e. minimum diameter) and possibly also of the transmission gain. Preferably, the apparatus 100 has a connector (not represented) for detachably connecting the desired bore head.

The transducer 40, which could be a part of the apparatus 100, as represented, or also of the accessory 120, converts the displacement of the micrometric screw to an electric signal that is acquired by the logical circuit 70, which could be a microcontroller, a FPGA, an ASICS, a system-on-chip, or any suitable logic circuit. Importantly, the relationship between the linear displacement of the screw that is read by the transducer, and the radial stroke of the contacts 125 is not always the same but depends on the accessory that is used. Each bore measuring head, for example, has individually distinct offset and transmission ratio.

The accessory 120 comprises a machine-readable tag 30 storing individual metrology information required to convert the quantity sensed by the transducer 40 into the desired measurement. In the case of the inner micrometer of this embodiment, for example, the tag 30 may store an offset parameter and a transmission ratio parameter. The tag 30 is compatible with a reader unit 60 of the measuring apparatus such that the logical circuit 70 can read the metrology information of the tag, and convert the value generated by the transducer into a measure value in the desired units. The measure value can be presented on a display 80, stored in a memory 105 for future uses, or transmitted to an external device through the communication interface 90, according to the needs.

The tag 30 may record also an identification code that allows the identification of the accessory 120 individually, or as belonging to a model. The identification can be used as key to select the necessary metrology information from a database 105 that is comprised in the apparatus, or from an external database 115 that may be part of a network 200, accessible through the communication interface.

This manner of fetching the conversion parameter by a key is useful if the instrument is connectable to an external database 115, into which new accessories and their parameters can be added dynamically. The internal database 105 could also be updated, periodically or on command, over the interface 90. A combination of an internal database and of an external one is also possible.

Solutions in which the tag 30 contains the metrology information completely, on the other side, are simpler, use less storage resources, and do not depend on the availability of a database, internal or external.

The tag 30 is preferably an RFID tag that can be accessed by the reader interface 60 without physical contact when the accessory 120 is connected. Other forms of wireless electrical communication are also possible, including NFC and Bluetooth™.

Variants of the invention could use other forms of storage and communication, however. In one possible embodiment, the tag 30 could be a digital memory, for example a non-volatile EEPROM, connected to the apparatus by a suitable means of electric transmission, for example based on the 1-wire protocol or an equivalent one. The invention also includes optical recognition of barcodes, magnetic patterns, punched holes, or any suitable means of data storage and conveyance.

The metrology information may include any parameter useful to obtain the desired measurement, besides the mentioned offset and transmission ratio. For example, the metrology information may include a thermal correction coefficient, to apply when the temperature of the instrument is different from 20° C. The temperature can be measured in the measuring apparatus 100, in the accessory 120, in the tag 30, or in any suitable position. Nonlinear conversion curves can also be stored and used.

According to the realization, the network 200 could be a local network or a wide-area one, or the Internet. Portable instruments may not have an IP-capable interface and, in this case, the connection to the network may involve a proxy, for example an external server 110 or a portable device 135.

The instrument configuration can be transmitted to devices in the network 200, along with measured data, for display, logging, or further processing. For example, the mobile phone 135 could provide a convenient large display, and the server 110 could be used for logging and processing.

Precision instruments require repeated calibration for maximum performance. This is often done by measuring a dimension of a precisely machined calibration object (notably with an accuracy in submicron range). In the case of the bore gauge of this embodiment, the calibration object is usually a ring of high-quality steel or ceramics, whose inner diameter has been accurately machined and measured to a known value, preferably with micron accuracy, more preferably with sub-micron accuracy.

Figure 2:
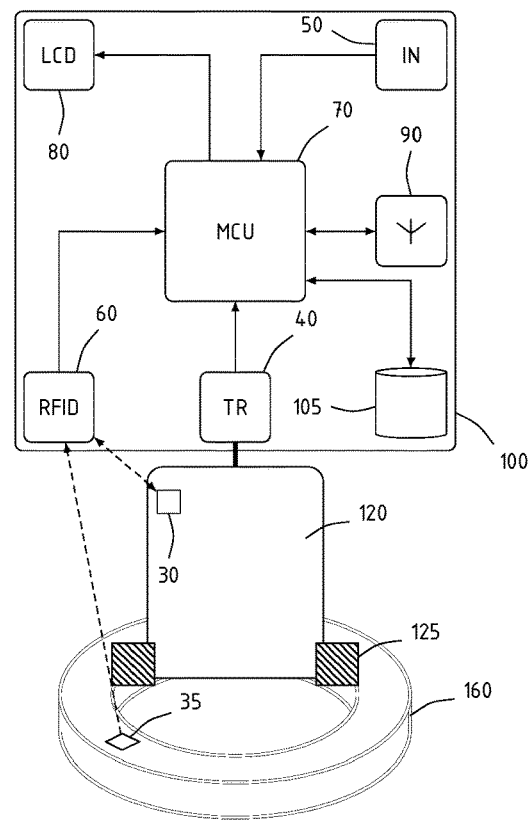
FIG. 2 shows a schematic representation of the device of FIG. 1 measuring a characterized calibration object.

FIG. 2 shows schematically a calibration of the apparatus of FIG. 1, in which the calibration dimension of the calibration ring 160 is measured. The logic circuit 70 compares the measured value with the known reference value. If the measures do not match, a correction is computed and stored, whereby successive measurements will be corrected automatically.

Preferably, the calibration body 160 also comprises a tag 35, which stores the value of the precise diameter, or of the relevant calibration dimension. The tag 35 is machine-readable by the measuring apparatus 100, preferably by the same reader 60 that is used to read the accessory tag 30. In this manner the logic circuit 70 knows automatically the value of the calibration dimension to use. It calculates the difference between the measured value and the reference value of the calibration body and stores it as an offset to apply to all subsequent measurements until the next calibration.

The corrections can be stored in the memory of the measuring apparatus 105 and/or in the tag 30 of the accessory, if the latter is writable. In this manner the accessory will be automatically corrected until the next calibration, even if the accessory is detached, and then reattached again, possibly to a different device 100.

Not only the arrangement of FIG. 2 is convenient because it dispenses the manual entry of the known calibration value: in a preferred variant, the measuring apparatus 100 is arranged to initiate a calibration procedure when it detects the presence of the gauge tag 35. The user should preferably confirm the calibration by a deliberate action on an input means 50, for example a push button.

Preferably, the measuring apparatus is arranged to verify automatically the compatibility between the calibration object 160 and the instrument and/or the accessory 120 before proposing a calibration.

The logic circuit 70 can also be configured to perform a "slope" calibration by measuring two or more gauges. By fitting a straight line to the measured versus reference values, a scale factor can be calculated and applied to all subsequent measurements. Preferably the user indicates, via input 50, the number of calibration gauges to be measured and measures them in sequence. The reference dimensions of each gauge, received through 60, are then compared with the actual measured values and the slope is calculated by the logic circuit of the device.

With the use of multiple calibration gauges, the data of measured values versus reference values can be fitted by more complex polynomials to correct for any non-linearities in the measuring apparatus.

As mentioned above, the linear or polynomial corrections calculated by the logic circuit 70 can be stored in the tag 30 of the accessory if the latter is writable.

As already mentioned, the invention is not limited to the embodiment of FIGS. 1 and 2 but may be applied also to other portable instruments like micrometres or height gauges. The invention is applicable to any portable instrument that measures a metrology-related quantity by using accessories.

The invention is not limited to reading metrology information from one accessory but, if the measurement requires a combination of two or more accessories, the measuring apparatus can read information from all the accessories automatically.

Figure 3:
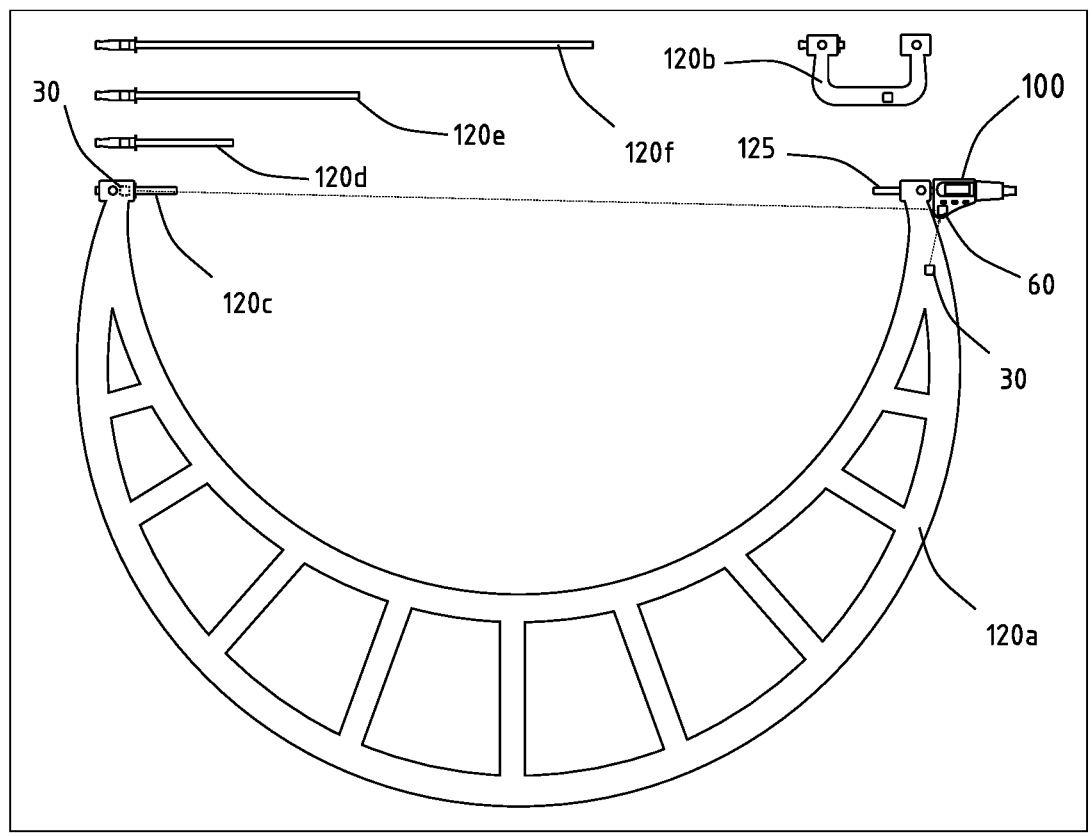
FIG. 3 shows schematically another embodiment of the present invention including an outer micrometer with interchangeable jaws and anvils.

FIG. 3 illustrates a different embodiment in which the measuring apparatus consists of a micrometer 100 that can be installed interchangeably on precision jaws of different sizes to allow an extended measurement range. FIG. 3 shows a small jaw 120b and a larger one 120a, on which the micrometer 100 is installed. Since the span of the jaw 120a exceeds the useful stroke of the tip 125, a set of interchangeable anvils 120c-120f of different lengths is also provided.

In the embodiment, the jaw 120a and/or the anvils 120c-120f include a tag 30 that is compatible with a reader 60 in the measuring apparatus. The micrometer 100 can read these tags automatically and independently, determining in this manner the jaw/anvil combination that is mounted and set the offset of the measure appropriately.

Such a micrometer cannot be "zeroed" as a conventional one because the tip cannot be brought in contact with the anvil. One or more calibration gauges (not illustrated) are provided to set precisely the micrometer offset. Preferably the calibration gauge can also be identified automatically by a tag compatible with the reader 60 in the micrometer, as already described.

According to another inventive aspect, the measuring apparatus could adapt other measuring parameters, for example a contact force or an approach velocity, dependent on the nature of an accessory connected thereto. For example, a variant of the invention concerns a micrometer with special interchangeable tips, such as flat or conical ones. The tips are marked by appropriate tags compatible with the reader, such that the micrometer 100 would have information on the tip length and set its zero parameter accordingly. The micrometer 100 can also adjust automatically the contact force, or other measuring parameters, dependent on the nature of the tip selected.

The accessory and/or the calibration gauge can also store other metrology information such as production date and/or calibration date. The measuring apparatus receives this information and can validate the measurement if the dates are within a predetermined range.

Another embodiment of the invention, which is not illustrated, relates to inductive length transducers such as for example those described in U.S. Pat. No. 5,736,854 and EP2402714. These devices are traditionally connected by a cable to a control unit which provides the excitation signals and analyses the output to calculate precisely the displacement of the probe tip. Recent developments of inductive probes place the miniaturized control unit inside the body of the probe or connected to it by a suitable short cable such that all the signal processing is done locally and the digitized result is transmitted via an appropriate link, such as USB, ethernet or wireless network for storage and processing.

Preferably, the miniaturized control unit, which takes the place of the measuring apparatus 100 of previous embodiments, is detachably attached to the probe body and can be used in conjunction with different physical probes, which may be regarded as accessories of different range, sensitivity or force. An appropriate tag in the probe can be read by the control unit which then applies the required scale factor to the measurement. Additionally, the control unit can adapt the excitation signal, or other measuring parameters, to the information retrieved from the tag of the accessory. The serial number of the probe can also be read from the tag and associated with the measurement in the storage.

Calibration objects are not limited to rings, but may include also datum spheres, gauge blocks, and other. Another not illustrated embodiment relates to the use of gauge blocks of different sizes to calibrate measurements with a height gauge or a hand-held instrument like a micrometer. Instead of entering the gauge values manually, on the keyboard of the instrument, the user can scan a tag on the gauge blocks, for example an RFID or optical tag, with the instrument. In this way each gauge block is identified, and its value recorded along with its serial number, date code and other relevant information to establish traceability. Often, a suitable reference length is obtained by stacking together a plurality of gauge blocks. In this case these can be scanned individually, and their lengths are automatically summed in the instrument.

The described portable measuring device can enable particular advantageous measuring and/or calibrating methods.

In particular, the described portable measuring device can enable a method of measuring a metrology-related quantity comprising (steps of):
attaching an accessory to the measuring device;
reading a metrology information stored on the accessory by the device;
using the metrology information in the portable device to correct a measurement result.

Furthermore, the described portable measuring device can enable a method of calibrating comprising (steps of):
reading a reference value stored on a calibration object by the device;
calibrating the device by comparing, in the device, the reference value with a measure of the calibration object done by the device.

Furthermore, the described portable measuring device is particularly suitable, in cooperation with above-described accessories and above-described calibration objects, for implementing autocalibration and autoconfiguration, namely in form of a measuring device set.

The measuring device set can comprise:
a portable measuring apparatus 100 comprising a logic circuit 70 and a reader 60;

an accessory set comprising at least one of the above-described accessories 120 (i.e. one or more accessories) and a calibration set comprising at least one of the above-described calibration object (i.e. one or more calibration objects).

When the measuring apparatus is connected to one accessory of the accessory set, the measuring apparatus can be thus operatively arranged to:

read, with the reader, the individual metrology information of the connected accessory;

acquire, using the connected accessory, a signal dependent from a metrology-related property of one calibration object of the calibration set;

convert the signal into a measure value in the logic circuit, using the individual metrology information of the connected accessory;

read, with the reader, the individual calibration metrology information of the (measured) calibration object;

compare the measure value to a reference value based on the individual calibration metrology information (e.g. corresponding or derived from the individual calibration metrology information) and store a difference or a calibration information within the measuring apparatus and/or within the connected accessory.

Once the measuring device being autocalibration, the measuring device can be used to measuring a metrology-related quantity of a workpiece, namely by means of the measuring apparatus further operatively arranged to:

acquire, using the connected accessory, a signal dependent from a metrology-related property of the workpiece;

convert the signal into a measure value in the logic circuit, using the individual metrology information provided by the connected accessory;

correct said measure value by the stored difference or calibration information; and output the corrected measure value.

The measuring device set can enable a method of measuring a metrology-related quantity, the method can comprises (steps of):

attaching an accessory (e.g. one of the above-described accessories) to a portable measuring device (e.g. one of the above-described device);

acquire (e.g. by reading), in the portable measuring apparatus, an individual metrology information stored in the accessory;

acquire, in the portable measuring apparatus and using the accessory, a signal dependent from a metrology-related property of a calibration object (e.g. one of the above-described calibration objects);

convert, in the portable measuring apparatus, the signal into a measure value using the individual metrology information;

acquire (e.g. by reading), in the portable measuring apparatus, an individual calibration metrology information stored in the (measured) calibration object;

compare, in the portable measuring apparatus, the measure value to a reference value relying on (e.g. corresponding to or being based on) the individual calibration metrology information and store a difference or a calibration information within the measuring apparatus and/or within the accessory;

correct, by the stored difference or calibration information, subsequent measurements provided by using the accessory.

The step correcting comprises steps of:

acquire, in the portable measuring apparatus and using the accessory, a signal dependent from a metrology-related property of a workpiece (to be measured);

convert, in the portable measuring apparatus, the signal into a measure value in the logic circuit, using the individual metrology information provided by the connected accessory;

correct, in the portable measuring apparatus, said measure value by the stored difference or calibration information.

The method can comprise (a step of) output the corrected measure value.

REFERENCE SIGNS USED IN THE DRAWINGS

30 tag
35 gauge tag
40 transducer
50 input devices, buttons
60 reader
70 logic circuit, microcontroller
80 display
90 network interface
100 measuring apparatus
105 storage
110 server
115 remote storage
120 accessory
120*a-b* jaws
120*c-e* anvils
125 contact finger, tip
135 portable device, mobile phone
160 calibration object
200 network
230 workpiece

We claim:

1. A portable measuring device for measuring a workpiece, the device comprising:

a measuring apparatus comprising a logic circuit, a transducer and a reader; and an accessory interchangeably connectable to the measuring apparatus and storing individual metrology information about the accessory in a form compatible with the reader;

wherein, while the measuring apparatus is connected to the accessory, the transducer is configured to sense a displacement of a measuring portion of the accessory and the measuring apparatus is operatively arranged to:

read the individual metrology information with the reader;

acquire, using the transducer and the accessory, a signal dependent from a metrology-related property of the workpiece;

convert the signal into a measure value in the logic circuit, using the individual metrology information of the accessory; and output the measure value.

2. The measuring device of claim 1, wherein the metrology-related property is one among: linear dimension, thickness, radius of a sphere, inner diameter, outer diameter.

3. The measuring device of claim 1, wherein the individual metrology information includes at least one among: range, offset, scale factor.

4. The measuring device of claim 1, wherein the individual metrology information is stored into an RFID tag of the accessory, or a non-volatile memory of the accessory, or an optically-readable tag of the accessory.

5. The measuring device of claim 1, wherein the measuring apparatus has a connector arranged to attach to a mating part of the accessory, the reader being arranged to read the metrology information of an accessory attached to the connector.

6. The measuring device of claim 1, wherein the individual metrology information includes a digital value encoding a parameter of the accessory.

7. The measuring device of claim 1, wherein the individual metrology information includes a unique identifier, the measuring apparatus being operatively arranged to use the identifier as key value to obtain a parameter of the accessory from a data source.

8. The measuring device of claim 1, wherein the measuring apparatus is an electronic micrometer gauge, and the accessory is a bore head, wherein the individual metrology information includes a range and/or a scale factor.

* * * * *